(12) United States Patent
Han

(10) Patent No.: US 6,531,531 B1
(45) Date of Patent: Mar. 11, 2003

(54) METHOD AND COMPOSITION OF A HYDROPHILIC POLYMER DISPERSION CONTAINING AN INORGANIC FLOCCULANT TO BE USED FOR THE TREATMENT OF WASTE WATER

(75) Inventor: Sung Wook Han, Kyungsangbuk-do (KR)

(73) Assignee: Green Technology Inc., Kyunggi-do (KR)

( * ) Notice: Subject to any disclaimer, the term of this patent is extended or adjusted under 35 U.S.C. 154(b) by 0 days.

(21) Appl. No.: 09/762,507

(22) PCT Filed: Aug. 19, 1999

(86) PCT No.: PCT/KR99/00462

§ 371 (c)(1),
(2), (4) Date: Feb. 8, 2001

(87) PCT Pub. No.: WO00/11052

PCT Pub. Date: Mar. 2, 2000

(30) Foreign Application Priority Data

Aug. 24, 1998 (KR) ............................................. 98/34276

(51) Int. Cl.$^7$ ............................ C08K 3/32; C08K 3/30; C08K 3/22; C08K 3/18
(52) U.S. Cl. ....................... 524/416; 524/423; 524/435; 524/437; 524/850; 523/1

(58) Field of Search ................................ 524/850, 416, 524/423, 435, 437; 523/1

(56) References Cited

U.S. PATENT DOCUMENTS 5,597,859 A    1/1997   Hurlock et al.

FOREIGN PATENT DOCUMENTS

| | | |
|---|---|---|
| EP | 0 630 909 A1 | 12/1994 |
| EP | 0 657 478 A2 | 6/1995 |
| EP | 0 839 767 A2 | 5/1998 |
| JP | 2-40287 A | 2/1990 |
| JP | 7-256300 A | 10/1995 |
| WO | WO 97/34933 | 9/1997 |

*Primary Examiner*—Kriellion A. Sanders
(74) *Attorney, Agent, or Firm*—Birch, Stewart, Kolasch & Birch, LLP

(57) ABSTRACT

The present invention relates to the method and composition of a hydrophilic polymer dispersion containing an inorganic flocculent to be used for the treatment of waste water. More particularly, it relates to the method and composition of a hydrophilic polymer dispersion containing an inorganic flocculent, which has the properties of declining and reducing the water content of flock as well as water content of sludge cake obtained after treating the waste water.

12 Claims, No Drawings

METHOD AND COMPOSITION OF A HYDROPHILIC POLYMER DISPERSION CONTAINING AN INORGANIC FLOCCULANT TO BE USED FOR THE TREATMENT OF WASTE WATER

TECHNICAL FIELD

The present invention relates to the method and composition of a hydrophilic polymer dispersion containing an inorganic flocculant to be used for the treatment of waste water. More particularly, it relates to the method and composition of a hydrophilic polymer dispersion containing an inorganic flocculant, which has the properties of declining and reducing the water content of flock as well as water content of sludge cake obtained after treating the waste water.

BACKGROUND ART

It has been recognized that the reduction of water content of sludge cake in the waste water is an important technical matter for protecting the environmental contamination. Especially, the reduction of industrial waste and waste water sludge becomes an important matter for the environment. The reduction of sludge has an advantage of the efficient development of land by minimizing the waste treatment space.

To minimize the content of water in the sludge, the method using thermal energy has been used. However, it has a lot of drawbacks to require high energy together with high operation cost. Accordingly, the use of flocculant to treat the waste water has been considered as an efficient method for treating the waste water.

The method of flocculation using a flocculant can be explained by following mechanism. Firstly, colloidal particles are enhanced to be coagulated by the addition of inorganic flocculant in the waste water; secondly, the coagulated particles become larged by the influence of flocculant; lastly, the flocculated particles are separated by the difference of sedimental velocity or floating velocity in the waste water.

In the waste water having metal hydroxide, the anionic flocculant is desirable, whereas the cationic flocculant is desirable in the waste water having sulfur compound or clay. Further, the anionic flocculant is effective for treating the water in the neutral waste water.

Recently, the technology using polymer flocculant has been developed. The polymer flocculant used for the treatment of colloidal materials in waste water is high molecular weight compound, and it neutralizes and collects the suspended particles. Further, the polymer flocculant is classified into following groups: i) anionic polymer flocculant, such as, sodium alginate, sodium polyacrylate, salt of maleic acid copolymer, partly hydrolyzed salt of polyacrylamide, ii) cationic polymer flocculent, such as, acrylate, methacrylate, hydrophilic aniline resin hydrochloride salt, polythiourea hydrochloride salt, polyethylene amino triazole, polyvinyl benzyl trimethyl ammonium fluoride, chitosan, polyethylene amine, vinylpyridine copolymer, and iii) nonionic polymer flocculent, such as, starch, hydrophilic urea resin, polyacrylamide, polyoxyethylene.

Generally, it has been reported that the polymer flocculant forms the flock induced by bridging between colloid particle and polymer flocculant according to the force between them. The commercially marketed polymer flocculant has molecular weight in the range of 10,000~10,000,000.

The commercially marketed product contains the polymer or copolymer of quaternary acrylate, dimethyl diallyl ammonium chloride, tertiary acrylate and acrylamide.

The flocculation by the polymer flocculant depends upon the degree of linear polymerization of the polymer flocculant, that is, molecular weight and ionic density. Further, the degree of polymerization is controlled by condition of polymerization, whereas the ionic density is controlled by molar ratio of cationic monomer.

Generally, the polymer flocculant having high degree of polymerization makes a large flock, and the polymer flocculant having strong ionic density raises a strength of flock. Also, there is a correlation between degree of polymerization and ionic density, so that the higher molecular weight of polymer flocculant becomes, and the lower ionic density of polymer flocculant becomes.

The flock formed by single injection of the polymer flocculant contains a large amount of water. Therefore, it requires additional steps for lowering water content of the flock. However, it has some limitation for fully drying the flock, because the flock has hygroscopic property in itself.

The water content of the flock can influence the water content of dehydrated sludge cake, which is removed and reclaimed. The smaller water content of the sludge cake induces the smaller amount of cake, which causes the efficient treatment of the sludge. Further, such smaller cake sludge saves the cost for removing and reclaiming it.

The aqueous dispersions of water-soluble nonionic and anionically charged vinyl and allyl addition polymers were disclosed in WO 97/34933. Also, they can be obtained by polymerizing in the presence of an anionically charged water-soluble polymer stabilizer in a saturated salt solution.

Further, the polymerization process of preparing a water-soluble polymer in the form of a water-continuous dispersion was described in European Pat. 0 630,909 A1. In this process, the peak in-production viscosity developed in the aqueous reaction mixture is lower than the peak in-production viscosity developed in an equivalent batch polymerization.

For forming dialkylaminoalkyl (meth)acrylamide polymer dispersions, a novel dispersant system was disclosed in U.S. Pat. No. 5,597,859. Further, European Pat. 0 839,767 A2 suggested a method for clarifying ink-laden water obtained from the recycling of paper stocks by treating said water with a conventional coagulant followed by treatment with a hydrophilic dispersion polymer. In this method, the hydrophilic dispersion flocculant is a copolymer of DMAEA·MCQ [dimethylaminoethyl (meth)acrylate methyl chloride quaternary] and (meth)acrylamide.

The improved process for the preparation of water soluble polymer dispersion was disclosed in European Pat. 0 657, 478 A2.

However, none of prior references discloses the far enhanced waste water treatment activity compared to formerly developed hydrophilic polymer dispersion.

DISCLOSURE OF INVENTION

The present invention relates to a hydrophilic polymer dispersion composition containing an inorganic flocculant and a method for preparing such composition which comprises the following steps of: i) mixing acrylamide, cationic monomer, anionic monomer, polymer of cationic monomer, anionic salt and inorganic flocculant, ii) 1st-polymerizing the mixture obtained in previous step, iii) 2nd-polymerizing the 1st-polymerized mixture containing unreacted monomers completely, and iv) adding and mixing anionic salt to obtained polymers.

Further, the hydrophilic polymer dispersion containing an inorganic flocculent of the present invention is prepared by following steps of: i) mixing 1.0~25 wt % of acrylamide, 0~2 wt % of anionic monomer selected from the group consisting of acrylic acid, methacrylic acid and itaconic acid, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 1~10 wt % of inorganic flocculant, 0.01~1 wt % of nonionic surfactant, 0.05~2 wt % of dispersion stabilizer and 40~75 wt % of water;

ii) 1st-polymerizing the mixture in addition to 0.001~0.1 wt % of polymerization initiator to said mixture;

iii) 2nd-polymerizing the 1st-polymerized mixture containing unreacted monomers completely; and iv) adding and mixing 10~30 wt % of anionic salt to obtained polymers.

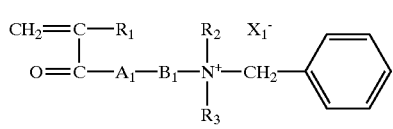

formula I wherein
$R_1$ is hydrogen atom or methyl
$R_2$ and $R_3$ are each independently alkyl group having 1 to 3 carbon atoms
$A_1$ is oxygen atom or NH;
$B_1$ is alkylene group having 2 to 4 carbon atoms or hydroxypropylene; and
$X_1$ is anionic counter ion.

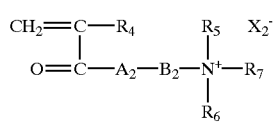

formula II wherein
$R_4$ is hydrogen atom or methyl
$R_5$ and $R_6$ are each independently alkyl group having 1 to 2 carbon atoms
$R_7$ is hydrogen atom or alkyl group having 1 to 2 carbon atoms
$A_2$ is oxygen atom or NH;
$B_2$ is alkylene group having 2 to 4 carbon atoms or hydroxypropylene; and
$X_2$ is anionic counter ion.

BEST MODE FOR CARRYING OUT THE INVENTION

The conventional hydrophilic polymer flocculant contains a dispersion of polymer of mixture of cationic monomers and anionic monomers, whereas the hydrophilic polymer dispersion of the present invention contains further inorganic flocculant. Further, the present invention enhances the degree of polymerization of the polymer dispersion by adding and mixing nonionic surfactant to the mixture of cationic monomers.

Acrylamide can be used as monomer, and acrylic acid, methacrylic acid or itaconic acid can be used as anionic monomer.

The cationic monomer of formula I and cationic monomer of formula II can be mixed in a ratio of 10:0 to 2:8.

The reacting materials for the polymer are a cationic monomer of formula I, cationic monomer of formula II, and homopolymer of cationic monomer of formula I, homopolymer of cationic monomer of formula II, or copolymer of cationic monomer of formula I and formula II as polymer in the present invention. The higher content of the cationic monomer induces the higher ionic density, which causes the improved strength of flock. The quantity of monomers and polymers can be determined experimentally in consideration of size and strength of flock in flocculation.

Said monomer is soluble in initial salt solution, but polymer material is insoluble in initial salt solution. Therefore, the anionic salt has the function for preparing dispersion by dispersing polymer materials to fine particles. Said anionic salt is selected from the group consisting of ammonium sulfate, ammonium chloride, sodium sulfate, magnesium sulfate, aluminium sulfate, ammonium hydrogenphosphate, sodium hydrogenphosphate, and potassium hydrogenphosphate. Further, half or more of said anionic salt can be added before polymerization reaction, and the remaining said anionic salt has to be added after polymerization reaction. It is proved as the desirable preparation method for the stable polymer dispersion experimentally.

The inorganic flocculant firstly introduced in the present invention has the functions of improving the strength of flock and reducing the water content of sludge cake. The dehydrating function of inorganic flocculant promotes the patch flocculation of flock, which raises density of flock and reduces the water content of flock. Said inorganic flocculant is selected from the group consisting of polyaluminium chloride, ferrous chloride, ferric chloride, ferrous sulfate, ferric sulfate, aluminium chlorohydrate, and aluminasol. In case that the content of inorganic flocculant is less than 1 wt %, the reducing effect of water content shall not be sufficient. On the other hand, in case that the content of inorganic flocculant is more than 10 wt %, the stability of dispersion shall be declined by inhibiting the dispersed state of polymer flocculant.

Said polymer flocculant and inorganic flocculant can be stabilized by stabilizer, such as, nonionic surfactant and glycerin. The particles of dispersed polymer material is stabilized by following mechanisms of: i) steric hindrance of said nonionic surfactant and ii) repulsion caused by high charge of the polymer material. In case that the content of nonionic surfactant is less than 0.01 wt %, stability of dispersion obtained is lowered. Further, in case that the content of nonionic surfactant is more than 1 wt %, wasted surfactant remains. Also, 0~2 wt % of glycerin can be used as subsidiary dispersant. In case that the content of glycerin is more than 2 wt %, glycerin is wasted. Further, the nonionic surfactant of the present invention activates the nuclei formation, which results in the reduction of in-production viscosity and the stabilization of polymer particles caused by the steric hindrance of the surfactant. Therefore, the nonionic surfactant has a role to enhance the mobility of the final product.

The azobis initiator, which is a kind of radical initiator, can be used for polymerizing said cationic monomer of formula I and formula II and said anionic monomer. 0.001~0.1 wt % of said polymerization initiator can be used.

In case that the content of initiator is less than 0.001 wt %, there are some drawbacks of: i) not maintaining polymerization reaction and ii) obtaining insoluble polymer material having high degree of polymerization. On the other hand, in case that the content of initiator is more than 0.1 wt %, there are some drawbacks of: i) increasing and generating the heat during the polymerization, ii) decreasing the yield of polymer material, and iii) preparing polymer material having low degree of polymerization.

The viscosity and pH of said hydrophilic polymer dispersion containing an inorganic flocculent can be controlled less than 1,000 cps and more than pH 3.0. It is desirous that the viscosity and ionic density of 1% aqueous solution of the hydrophilic polymer dispersion is more than 40 cps and more than 1.0 meq. In case that the product is centrifuged to 1,800 rpm for 10 minutes, the precipitation has to be less than 5% of total weight in order to keep the product for a long time.

Further, the hydrophilic polymer dispersion containing an inorganic flocculent of the present invention is prepared by following steps of

[mixing step] i) mixing 1.0~25 wt % of acrylamide, 0~2 wt % of anionic
monomer, 1.0~30 wt % of cationic monomer mixture of compound of
formula I and formula II, 0.5~5 wt % of polymer selected from the group consisting of homopolymer of compound of formula I, homopolymer of compound of formula II and copolymer of compound of formula I and formula II, 10~30 wt % of anionic salt, 1~10 wt % of inorganic flocculent, 0.01~1 wt % of nonionic surfactant, 0.05~2 wt % of dispersion stabilizer and 40~75 wt % of water in the reactor, ii) nitrogen purging in the reactor, and agitating said mixture more than 30 rpm;
[initiator adding step] i) heating said mixture at 30~50° C., ii) adding 0.00 1~0.1 wt % of initiator to said mixture;
[1st-polymerizing step] 1st-polymerizing said mixture at 30~50° C. for 3~6 hours;
[2nd-polymerizing step] 2nd-polymerizing the 1st-polymerized mixture containing unreacted monomers completely by adding 0.001~0.1 wt % of initiator to said mixture for 3~15 hours;
[finishing step] i) adding the remaining anionic salt to the polymer, ii) adjusting pH of the polymer less than 4.0, iii) sieving the polymer using 40~100 mesh.

In the mixing step, the inside of a reactor is purged with nitrogen, and the raw materials are mixed and agitated homogeneously. Particularly, a part of anionic salt is added in this step, and the remaining part of anionic salt is added after the polymerization. This mixing step is important for raising stability of the dispersion In the initiator adding step, the initiator, for example, azobis initiator or redox initiator, such as, ammonium persulfate and sodium bisulfite is added for polymerizing anionic monomer, cationic monomer of formula I and II. Said mixture has to be heated at 30~50° C. where the polymerization is initiated. Further, in the 1st-polymerizing step, the reactor has to be cooled to achieve the maintenance of temperature at 30~50° C. This step has to be maintained for 3~6 hours until polymerization is finished.

In the 2nd-polymerizing step, unreacted monomers in 1st-polymerizing step is completely reacted to form the polymer in addition to said initiator at 30~50° C. for 3~15 hours. Therefore, the polymer dispersion is obtained.

The final product is obtained by the finishing step. In case that the pH of polymer dispersion is more than 4.0, the stability of dispersion is lowered and the efficiency of dispersion is declined.

The present invention can be more specifically explained by the following examples. However, it should be understood that the examples are intended to illustrate, but not to limit the scope of the present invention in any manner.

EXAMPLE 1

Preparation of the Polymer Dispersion

The polymer dispersion is prepared by following steps of:i) mixing 138.941 g of 50% acrylamide aqueous solution, 126.761 g of dimethylaminoethyl acrylate benzyl chloride quaternary monomer (80%), 36.401 g of dimethylaminoethyl acrylate methyl chloride quaternary monomer (80%), 20.0 g of dimethylaminoethyl acrylate methyl chloride quaternary polymer (20%), 5.0 g of dimethyldiallyl ammonium chloride polymer (40%), 131.707 g of ammonium sulfate, 2.0 g of aromatic ethoxylate, 6.0 g of glycerin, 160.0 g of polyaluminium chloride (10%) and 304.897 g of water in the 5-neck flask, ii) nitrogen purging in the reactor, and agitating said mixture to 200 rpm, iii) heating said mixture at 46° C., iv) adding 0.04 g of azobis initiator (V-50) to said mixture, v) 1st-polymerizing said mixture at 46° C. for 3~6 hours, vi) 2nd-polymerizing the 1st-polymerized mixture containing unreacted monomers completely by adding 0.04 g of said initiator (V-50) to said mixture for 3~15 hours, vii) adding 68.293 g of ammonium sulfate to the polymer, vi) adjusting pH of the polymer to 4.0, ix) sieving the polymer using 60 mesh.

EXAMPLE 2

Preparation of the Polymer Dispersion

The polymer dispersion is prepared by following steps of i) mixing 190.211 g of 50% acrylamide aqueous solution, 102.270 g of dimethylaminoethyl acrylate benzyl chloride quaternary monomer (80%), 38.463 g of dimethyldiallyl ammonium chloride monomer (60%), 10.0 g of dimethylaminoethyl acrylate methyl chloride quaternary polymer (20%), 10.0 g of dimethyldiallyl ammonium chloride polymer (40%), 122.201 g of ammonium sulfate, 2.0 g of aromatic ethoxylate, 10.0 g of glycerin, 100.0 g of ferric sulfate (8%) and 337.055 g of water in the 5-neck flask, ii) nitrogen purging in the reactor, and agitating said mixture to 200 rpm, iii) heating said mixture at 37° C., iv) adding 0.05 g of azobis initiator (VA-044) to said mixture, v) 1st-polymerizing said mixture at 37° C. for 3~6 hours, vi) 2nd-polymerizing the 1st-polymerized mixture containing unreacted monomers completely by adding 0.05 g of said initiator (VA-044) to said mixture for 3~15 hours, vii) adding 77.108 g of ammonium chloride to the polymer, viii) adjusting pH of the polymer to 4.0, ix) sieving the polymer using 60 mesh.

EXAMPLE 3

Preparation of the Polymer Dispersion

The polymer dispersion is prepared by following steps of: i) mixing 34305 g of 50% acrylamide aqueous solution, 203,432 g of dimethylaminoethyl acrylate benzyl chloride quaternary monomer (80%), 87.627 g of dimethylaminoethyl acrylate methyl chloride quaternary monomer (80%), 18.75 g of dimethylaminoethyl acrylate methyl chloride quaternary polymer (20%), 15.625 g of dimethyldiallyl ammonium chloride polymer (40%), 116.747 g of ammonium sulfate, 2.0 g of aromatic ethoxylate, 125.0 g of aluminium chlorohydrate (10%) and 332.261 g of water in the 5-neck flask, ii) nitrogen purging in the reactor, and agitating said mixture to 200 rpm, iii) heating said mixture at 35° C., iv) adding 0.05 g of azobis initiator (VA044) to said mixture, v) 1st-polymerizing said mixture at 35° C. for 3~6 hours, vi) 2nd-polymerizing the 1st-polymerized mixture containing unreacted monomers completely by adding 0.05 g of said initiator (VA-044) to said mixture for 3~15 hours, vii) adding 63.253 g of ammonium chloride to the polymer, vii) adjusting pH of the polymer to 4.0, ix) sieving the polymer using 60 mesh.

The polymer dispersions prepared in Example 1~3 have less tan 2% of water content of flock as compared with conventional polymer dispersions in dry test.

EXAMPLE 4

Test of Flocculation Effect

The hydrophilic polymer dispersion containing an inorganic flocculant of the present invention and the commercially marketed polymer dispersions not containing an inorganic flocculant, such as, i) powder flocculant (A), ii) emulsion flocculant (B), and iii) dispersion flocculant (C) are selected as tested flocculants. The flocculation effect is measured by using the surplus sludge of manure waste water having pH 6.8 with 5,500 ppm of solid concentration, and the result is shown in Table 1.

This test is carried out by following steps of: i) adding 500 ml of sludge to each 500 ml beaker by using cylinder respectively, ii) adding each amount of the flocculant to said sludge by using pipet, iii) agitating said mixture in 100 rpm, iv) stop agitating and measuring the flock size at the time of finishing flock growth, v) agitating said mixture in 300 rpm for 10 seconds, vi) measuring the flock size,

TABLE 1

| Flocculant | Input amount (mg/l) | Flock size (mm) | Flock strength (min)* | Suspended solid concentration after flocculation (ppm) | water content of sludge cake (%) |
|---|---|---|---|---|---|
| Example 1 | 200 | 4~5 | 2~3 | 25 | 72 |
| Example 2 | 200 | 4~5 | 2~3 | 20 | 71 |
| Example 3 | 200 | 4~5 | 2~3 | 24 | 74 |
| A | 200 | 4~5 | 1~2 | 70 | 83 |
| B | 200 | 5~6 | 1~2 | 50 | 86 |
| C | 200 | 4~5 | 1~2 | 65 | 84 |

*shows the size of the flock which is measured after vigorous stirring of the mixture.

Further, the flocculation effect is measured by using the dried sludge of leather waste water having pH 7.2 with 18,000 ppm of solid concentration, and the result is shown in Table 2.

TABLE 2

| Flocculant | Input amount (mg/l) | Flock size (mm) | Flock strength (min) | Suspended solid concentration after flocculation (ppm) | water content of sludge cake (%) |
|---|---|---|---|---|---|
| Example 1 | 500 | 5~6 | 3~4 | 35 | 70 |
| Example 2 | 500 | 5~6 | 3~4 | 35 | 72 |
| Example 3 | 500 | 5~6 | 3~4 | 40 | 75 |
| A | 500 | 6~7 | 2~3 | 90 | 86 |
| B | 500 | 7~8 | 2~3 | 85 | 85 |
| C | 500 | 5~6 | 2~3 | 70 | 82 |

Further, the flocculation effect is measured by using the dried sludge of food waste water having pH 7.5 with 8,000 ppm of solid concentration, and the result is shown in Table 3.

TABLE 3

| Flocculant | Input amount (mg/l) | Flock size (mm) | Flock strength (min) | Suspended solid concentration after flocculation (ppm) | water content of sludge cake (%) |
|---|---|---|---|---|---|
| Example 1 | 250 | 3~4 | 2~3 | 8 | 71 |
| Example 2 | 250 | 3~4 | 2~3 | 10 | 74 |
| Example 3 | 250 | 3~4 | 2~3 | 12 | 73 |
| A | 250 | 3~4 | 1~2 | 25 | 83 |
| B | 250 | 4~5 | 1~2 | 20 | 81 |
| C | 250 | 4~5 | 1~2 | 45 | 84 |

In this test, the hydrophilic polymer dispersion of the present invention induces equal flock size and improved flock strength as compared with the commercially marketed polymer dispersions. Therefore, the hydrophilic polymer dispersion of the present invention has an excellent effect for removing sludge by forming flock.

The hydrophilic polymer dispersion of the present invention may be useful for the manufacture of paper to make an aqueous cellulosic suspension or slurry. Hence, said hydrophilic polymer dispersion will be important for the efficient cost of papermaking manufacture.

What is claimed is:

1. A hydrophilic polymer dispersion containing an inorganic flocculant prepared by following steps of:
   i) mixing 1.0~25 wt % of acrylamide, 0~2 wt % of anionic monomer selected from the group consisting of acrylic acid, methacrylic acid and itaconic acid, 1.0~30 wt % of cationic monomer mixture of compound of formula I and formula II, 0.5 ~5 wt % of polymer selected from the group consisting of homopolymer of compound of formula I, homopolymer of compound of formula II and copolymer of compound of formula I and formula II, 10~30 wt % of anionic salt, 1~10 wt % of inorganic flocculant, 0.01~1 wt % of nonionic surfactant, 0.05~2 wt. % of dispersion stabilizer and 40~75 wt % of water;
   ii) 1st-polymerizing the mixture with the addition of 0.001~0.1 wt % of polymerization initiator to said mixture;
   iii) $2^{nd}$-polymerizing the $1^{st}$-polymerized mixture containing unreacted monomers completely; and
   iv) adding and mixing 10~30 wt % of anionic salt to the obtained polymers.

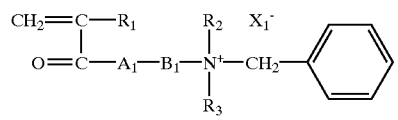

formula I wherein
$R_1$ is hydrogen atom or methyl;
$R_2$ and $R_3$ are each independently alkyl group having 1 to 3 carbon atoms;
$A_1$ is oxygen atom or NH;
$B_1$ is alkylene group having 2 to 4 carbon atoms or hydroxypropylene; and
$X_1$ is anionic counter ion.

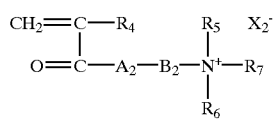

formula II wherein
$R_4$ is hydrogen atom or methyl;
$R_5$ and $R_6$ are each independently alkyl group having 1 to 2 carbon atoms;
$R_7$ is hydrogen atom or alkyl group having 1 to 2 carbon atoms;
$A_2$ is oxygen atom or NH;
$B_2$ is alkylene group having 2 to 4 carbon atoms or hydroxypropylene; and
$X_2$ is anionic counter ion.

2. The hydrophilic polymer dispersion according to claim 1, wherein said inorganic flocculant is selected from the group consisting of polyaluminium chloride, ferrous chloride, ferric chloride, ferrous sulfate, ferric sulfate, aluminium chlorohydrate, and aluminasol.

3. The hydrophilic polymer dispersion according to claim 1, wherein said anionic salt is selected from the group consisting of ammonium sulfate, ammonium chloride, sodium sulfate, magnesium sulfate, aluminium sulfate, ammonium hydrogenphosphate, sodium hydrogenphosphate, and potassium hydrogenphosphate.

4. The hydrophilic polymer dispersion according to claim 1, wherein said dispersion stabilizer is selected from the group consisting of nonionic surfactant and glycerin.

5. The hydrophilic polymer dispersion according to claim 1, wherein the ratio of cationic monomer mixture of compound of formula I and formula II is in the range of 10:0 to 2:8.

6. A process for preparing hydrophilic polymer dispersion containing an inorganic flocculant comprising the steps of:
   i) mixing 1.0~25 wt % of acrylamide, 0~2 wt % of anionic monomer selected from the group consisting of acrylic acid, methacrylic acid and itaconic acid, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 1~10 wt % of inorganic flocculant, 0.01~1 wt % of nonionic surfactant, 0.05~2 wt % of dispersion stabilizer and 40~75 wt % of water;
   ii) $1^{st}$-polymerizing the mixture with the addition of 0.001~0.1 wt % of polymerization initiator to said mixture;
   iii) $2^{nd}$-polymerizing the $1^{st}$-polymerized mixture containing unreacted monomers completely; and
   iv) adding and mixing 10~30 wt % of anionic salt to the obtained polymers.

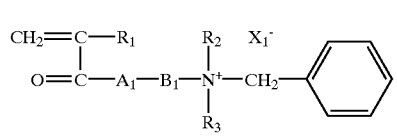

formula I wherein
$R_1$ is hydrogen atom or methyl;
$R_2$ and $R_3$ are each independently alkyl group having 1 to 3 carbon atoms;
$A_1$ is oxygen atom or NH;
$B_1$ is alkylene group having 2 to 4 carbon atoms or hydroxypropylene; and
$X_1$ is anionic counter ion.

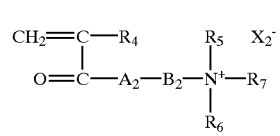

formula II wherein
$R_4$ is hydrogen atom or methyl;
$R_5$ and $R_6$ are each independently alkyl group having 1 to 2 carbon atoms;
$R_7$ is hydrogen atom or alkyl group having 1 to 2 carbon atoms;

A₂ is oxygen atom or NH;

B₂ is alkylene group having 2 to 4 carbon atoms or hydroxypropylene; and

X₂ is anionic counter ion.

7. The process for preparing hydrophilic polymer dispersion containing an inorganic flocculant according to claim 6, further comprising the steps of:

i) mixing 1.0~25 wt % of acrylamide, 0~2 wt % of anionic monomer, 1.0~30 wt % of cationic monomer mixture of compound of formula I and formula II, 0.5~5 wt % of polymer selected from the group consisting of homopolymer of compound of formula I, homopolymer of compound of formula II and copolymer of compound of formula I and formula II, 10~30 wt % of anionic salt, 1~10 wt % of inorganic flocculant, 0.01~1 wt % of nonionic surfactant, 0.05~2 wt % of dispersion stabilizer and 40~75 wt % of water in the reactor;

ii) nitrogen purging in the reactor, and agitating said mixture more than 30 rpm;

iii) heating said mixture at 30~50° C.;

iv) adding 0.00~0.1 wt % of initiator to said mixture;

v) $1^{st}$-polymerizing said mixture at 30~50° C. for 3~6 hours;

vi) $2^{nd}$-polymerizing the $1^{st}$-polymerized mixture containing unreacted monomers completely by adding 0.001~0.1 wt % of initiator to said mixture for 3~15 hours;

vii) adding the remaining anionic salt to the polymer;

viii) adjusting the pH of the polymer to less than 4.0; and ix) sieving the polymer using 40~100 mesh.

8. A hydrophilic polymer dispersion composition comprising:

i) acrylamide, ii) an anionic monomer selected from the group consisting of acrylic acid, methacrylic acid, and itaconic acid, iii) a cationic monomer mixture of a compound of formula (I) and formula (II), iv) a polymer selected from the group consisting of a homopolymer of a compound of formula (I), a homopolymer of a compound of formula (II) and a copolymer of a compound of formula (I) and formula (II), v) an anionic salt, vi) an inorganic flocculant, vii) a nonionic surfactant, viii) a dispersion stabilizer;

ix) and water

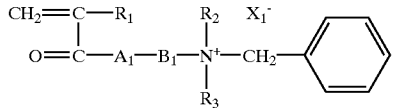

formula I wherein

R₁ is a hydrogen atom or methyl;

R₂ and R₃ are each independently an alkyl group having 1 to 3 carbon atoms;

A₁ is an oxygen atom or NH;

B₁ is an alkylene group having 2 to 4 carbon atoms or hydroxypropylene; and

X₁ is an anionic counter ion

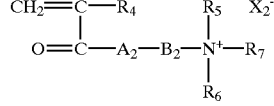

formula II

Wherein

R₄ is a hydrogen atom or methyl;

R₅ and R₆ are each independently an alkyl group having 1 to 2 carbon atoms;

R₇ is a hydrogen atom or an alkyl group having 1 to 2 carbon atoms;

A₂ is an oxygen atom or NH;

B₂ is an alkylene group having 2 to 4 carbon atoms or hydroxypropylene; and

X₂ is an anionic counter ion.

9. The hydrophilic polymer composition according to claim 8, wherein the inorganic flocculant is selected from the group consisting of polyaluminum chloride, ferrous chloride, ferric chloride, ferrous sulfate, ferric sulfate, aluminum chlorohydrate and aluminasol.

10. The hydrophilic polymer composition according to claim 8, wherein the anionic salt is selected from the group consisting of ammonium sulfate, ammonium chloride, sodium sulfate, magnesium sulfate, aluminum sulfate, ammonium hydrogen phosphate, sodium hydrogen phosphate and potassium hydrogen phosphate.

11. The hydrophilic polymer dispersion composition according to claim 8, wherein the dispersion stabilizer is selected from the group consisting of a nonionic surfactant and glycerin.

12. The hydrophilic polymer dispersion composition according to claim 8, wherein the ratio of the cationic monomer mixture of the compound of formula (I) and formula (II) is in the range of 10:0 to 2:8.

* * * * *